United States Patent [19]

Yearsin

[11] Patent Number: 4,583,004
[45] Date of Patent: Apr. 15, 1986

[54] CURRENT MONITORING CIRCUIT FOR STATIC SWITCH OF UNINTERRUPTABLE POWER SYSTEM

[75] Inventor: James J. Yearsin, Columbus, Ohio

[73] Assignee: Solidstate Controls, Inc., Columbus, Ohio

[21] Appl. No.: 534,810

[22] Filed: Sep. 22, 1983

[51] Int. Cl.$^4$ .............................. H02J 7/00; H02J 9/00
[52] U.S. Cl. ........................................ 307/64; 307/66; 307/87; 361/95; 361/94
[58] Field of Search ..................... 307/44, 46, 64, 66, 307/86, 87; 361/94, 95, 96, 97

[56] References Cited

U.S. PATENT DOCUMENTS

| | | | |
|---|---|---|---|
| 3,515,896 | 6/1970 | Swing et al. | 307/64 |
| 4,099,692 | 7/1978 | Kolkman | 307/64 X |
| 4,160,917 | 7/1979 | Wald | 307/74 X |
| 4,180,745 | 12/1979 | Bartlett et al. | 307/87 X |
| 4,347,541 | 8/1982 | Chen et al. | 361/96 X |

FOREIGN PATENT DOCUMENTS 76333 7/1978 Japan ...................................... 307/64

OTHER PUBLICATIONS

Motorola Linear Integrated Circuits, Series C Motorola, Inc. 1979, pp. 6-125 to 6-130.

Primary Examiner—A. D. Pellinen
Assistant Examiner—Derek S. Jennings
Attorney, Agent, or Firm—Frank H. Foster

[57] ABSTRACT

A circuit for monitoring the load current supplied by an uninterruptable power supply for transferring the load to a secondary source when the load current exceeds the capability of the uninterruptable power system. A signal representing the load current is simultaneously, continuously compared to a first reference level and a second reference level. The second reference level has a greater effective magnitude than the first reference level and whenever it is exceeded by the instantaneous signal the transfer is initiated. The transfer is also initiated whenever the signal uninterruptably exceeds the first reference level for a selected period of time.

8 Claims, 5 Drawing Figures

CURRENT MONITORING CIRCUIT FOR STATIC SWITCH OF UNINTERRUPTABLE POWER SYSTEM

FIELD OF THE INVENTION

This invention relates generally to the control and protection of equipment which provides reliable and continuous electrical power to loads which require dependable quality power and more particularly relates to a circuit for monitoring the load current from an uninterruptable power system and for switching the load to an alternative source of power in the event the load current exceeds the capability of the uninterruptable power system.

BACKGROUND OF THE INVENTION

Modern electronic equipment utilized in computer operations, communications, electrical utilities, industrial processes and the like often requires a continuous, dependable, high performance source of uninterrupted electrical power. A power failure or malfunction in supplying these critical loads can cause a major disruption of other operations and consequent substantial increases in cost and loss of service.

An uninterruptable power system delivers a clean, regulated sine wave to linear loads which is free of transients. Like most electrical devices, there are limits to the RMS and peak currents at which uninterruptable power systems are capable of operating. Such power systems typically consist of an AC to DC converter comprising a transformer connected to the electrical utility, a rectifier and filter for applying a DC voltage to a battery and a DC to AC inverter comprising an oscillator followed by a filter to provide the quality load current.

In the event of a malfunction of the uninterruptable power system or in the event of an excessive current demand due to an overload or short which would cause current to flow in excess of the capability of the uninterruptable power system, it is necessary that the load be switched from the output of the uninterruptable power system directly to the electrical utility. The current monitoring and the load transfer from the uninterruptable power system to the utility is accomplished by a static switch. The static switch is desirable not only for preventing overload of and damage to the uninterruptable power system but primarily for maintaining load voltage and current to the extent possible and for providing sufficient current capacity for clearing branch fuses in the shortest possible time. In order to uphold and maintain the integrity of the power delivered to the critical load and to provide satisfactory protection to the uninterruptable power source it is desirable that such a load transfer occur within one-quarter of a cycle of the utility power.

Because the heat generated by electrical currents is a major factor in the current limitations of electrical equipment, most electrical equipment has a maximum RMS current limit. However, an RMS measurement requires an averaging over at least one cycle. Therefore, the RMS value of the electrical power cannot be monitored in uninterruptable power systems since transfer is desired in less than one-quarter cycle.

In the past, load current supplied by an uninterruptable power system was monitored by circuitry such as that shown in U.S. Pat. No. 3,515,896. Such circuitry detected the peak of a signal which represented the load current. Whenever this peak exceeded a selected level the transfer was initiated.

The circuitry of U.S. Pat. No. 3,515,896 rests upon the assumption that the current to the critical load is sinusoidal. It detects the peak value of the sinusoid and initiates a transfer when the peak value exceeds the peak of a sinusoid which has an RMS value exceeding the RMS capability of the circuit. This current monitoring system is, therefore, dependent upon the relationship in a sinusoid between the peak of the sinusoid and the RMS value of the sinusoid. Such circuitry continues to operate well so long as the ratio of peak to RMS value remains $\sqrt{2}$.

Recently, due to the increased use of switching power supplies, SCR controlled loads and the like, critical loads have become increasingly non-linear and therefore their currents have become non-sinusoidal.

In order to quantify the non-linear waveforms the IEEE Standard Dictionary Of Electrical And Electronic Terms defines a "crest factor" for periodic waveforms as the ratio of its crest, peak or maximum value to its root-mean-square value. A sinusoidal waveform exhibits a crest factor of $\sqrt{2}$. However, as a sinusoid is distorted by a non-linear load its peaks may become higher and yet narrower. Consequently, its peak may increase substantially with no corresponding increase and possibly even a decrease in its RMS value.

In such circumstances the peak detector of the prior art described above, because it responds only peaks, will prematurely initiate the load transfer from the uninterruptable power source to the utility for some non-sinusoidal waveforms having a higher crest factor than the sinusoid even though the RMS current is lower than the maximum permissible RMS current. For example, a static switch which is calibrated to transfer a sinusoidal waveform at 120% of its nominal maximum RMS rating would cause the transfer of the load at only 56% of the nominal maximum RMS rating with a current waveform having a crest factor of 3.

Because the prior art peak detector would transfer at an RMS value which is below the equipment's capability, it might appear that the peak level at which transfer is initiated merely needs to be raised to accomodate the high crest factor currents which are possible from the non-linear loads. While this might work for the selected crest factor, problems are then created for sinusoidal currents and linear loads. If a linear load were encountered resulting in a sinusoidal load current, transfer would not be initiated until the RMS current had very substantially exceeded the maximum capability of the uninterruptable power supply.

For example, if the load current detector were designed and adjusted to initiate the transfer at the appropriate peak for a load current having a crest factor of 3, then with that selected adjustment a sinusoidal load current would not be switched until the RMS current had exceeded 212% of its nominal maximum rating.

There is therefore a need for a new static switch design for monitoring load current which can sense an excessive RMS current and provide a transfer within one-quarter cycle and still initiate transfer at the proper RMS current for load current over a broad range of crest factors. There is a need for a monitoring circuit which will not prematurely transfer a load as a result of a high crest factor current and yet will initiate the transfer as a result of a lower crest factor current when maximum RMS current is exceeded.

BRIEF SUMMARY OF THE INVENTION

In the present invention a signal representing the instantaneous load current is simultaneously compared to first and second effective reference levels. The second reference level is effectively greater in magnitude than the first reference level. A transfer is initiated whenever the load current signal exceeds the higher second reference level. Additionally, whenever the signal representing the load current exceeds the lower, first reference level a timing cycle is initiated. If the signal uninterruptedly remains above the first reference level for a selected interval of time, a transfer is initiated.

Figure 1:
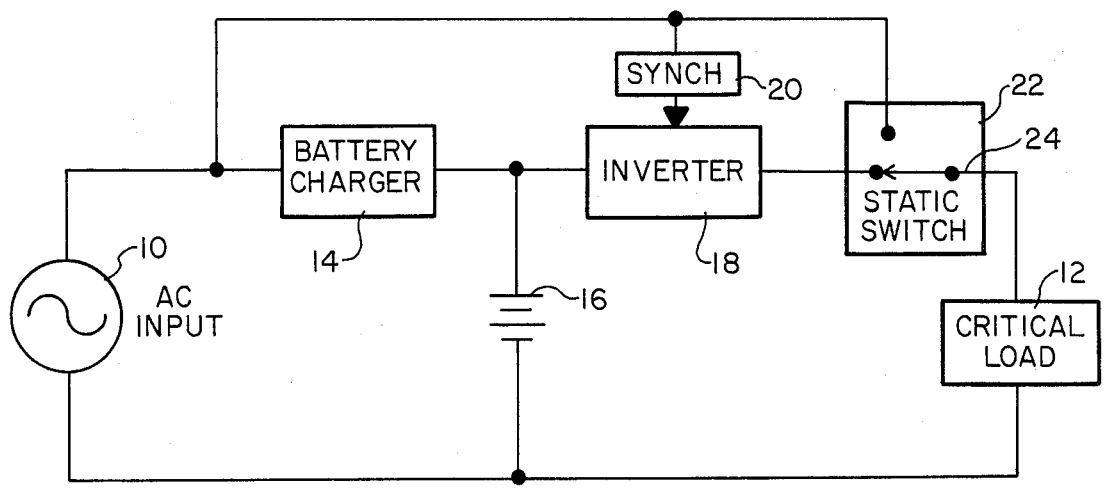
FIG. 1 is a simplified block diagram of an uninterruptable power system connecting an AC input from a electric utility to a critical load and including a static transfer switch.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

FIG. 1 illustrates an alternating current source 10, such as a commercial utility, connected to a critical load 12 through an uninterruptable power system. The input to the uninterruptable power system is applied to a full wave rectifier and filter forming a battery charger 14 which supplies DC power to a battery 16 and to the input of an inverter circuit 18. The inverter circuit 18 is essentially an oscillator which converts its DC input power to an alternating square wave output which is then filtered so that the inverter output is a smooth, continuous alternating current.

The uninterruptable power system has a synchronization circuit 20. Its input is connected to the AC input 10 and its output is connected to control the phase of the oscillator circuit in the inverter 18. In this manner, the phase of the alternating output of the inverter 18 is maintained identical with the phase of the AC input 10.

A static switch 22 permits the critical load to be supplied in the alternative either by a primary source, the uninterruptable power system, or by a secondary source which is the AC input 10.

The critical load may be transferred from the primary source to the secondary source either manually or automatically and that transfer may be initiated by a variety of different conditions. However, the present invention deals with the circuitry of the static switch which monitors the current to the critical load and initiates the transfer when the current exceeds the capability of the uninterruptable power system.

Figure 2:
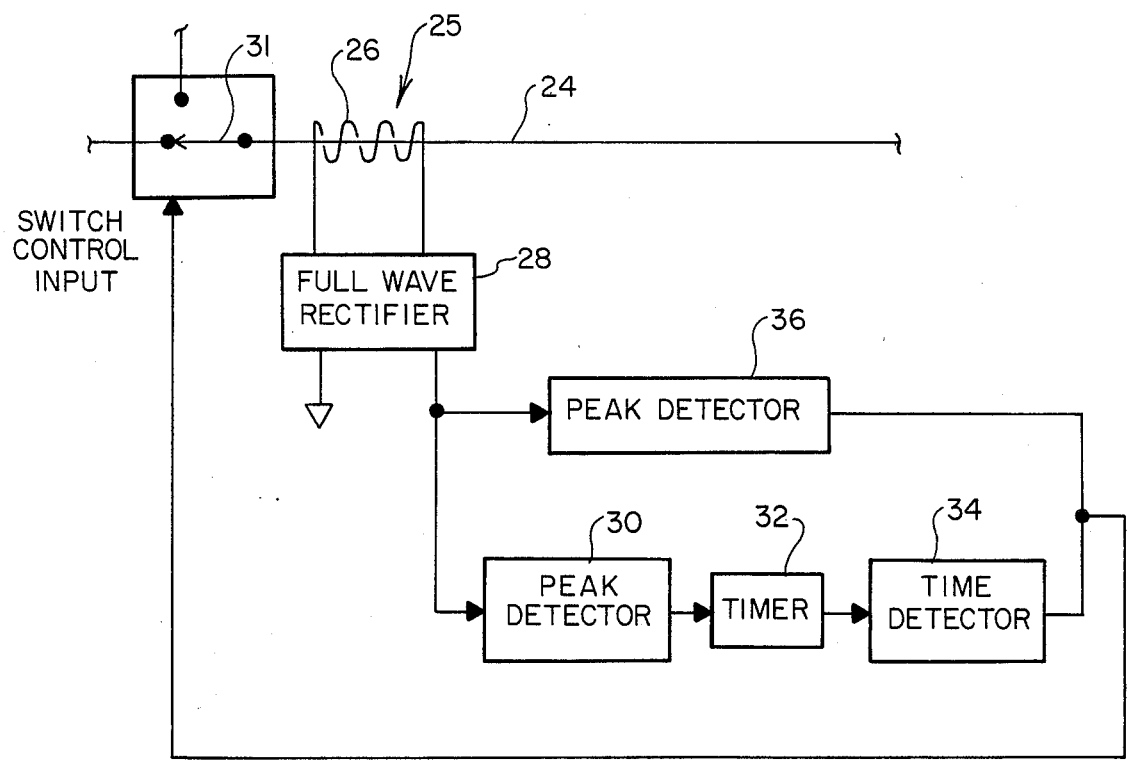
FIG. 2 is a simplified block diagram of the static transfer switch including its current monitoring circuit embodying the present invention.

FIG. 2 is a block diagram illustrating the monitoring and detection circuit of the present invention. One of the load current conductors, such as conductor 24, is linked to a signal conversion means 25 which provides an output signal which is proportional to and therefore represents the load current. The signal conversion means includes one induction coil 26 or step down transformer connected to a full wave rectifier 28. The stepped down signal is rectified so that its peaks are of the same polarity.

A first peak detector 30 has its input connected to the output of the signal conversion means 25. The peak detector 30 includes a first reference level generating circuit and compares the input signal to that first reference level. Whenever the signal which is input to the peak detector 30 exceeds the first reference level, the output state of the first peak detector circuit 30 switches. That output is connected to the input of a timing circuit 32. The timing circuit 32 times the duration that the output of the peak detector has switched states and thus measures the duration that the input signal to the peak detector 30 remains above the first reference level of the first peak detector 30.

A time detector circuit 34 is connected to the output of the timing circuit 32 and changes its output state when the timing circuit 32 exceeds a selected time interval. The output of the time detector 34 is connected to the control input of the single pole, double throw switch 31 so that the load is transferred from the primary to the secondary source whenever the input signal from the level conversion means 25 remains continuously above the first reference level of the peak detector 30 for a time which exceeds the selected time interval.

A second peak detector circuit 36 also has its input connected to the output of the signal conversion means 25 and has its output connected to the control input of the single pole, double throw switch 31. The second peak detector 36 includes a circuit for generating a second reference level and changes its output state to actuate the switch 31 and transfer the load whenever the input signal to the second peak detector 36 exceeds its second reference level.

The circuit of FIG. 2 operates by continuously comparing a signal representing the instantaneous load current to a first reference level generated in the peak detector 30. The duration that this signal uninterruptably remains greater than that first reference level is measured by the timer 32. Whenever the time detector 34 detects that the duration exceeds a selected time interval, the transfer of the load is initiated. Simultaneously, a signal representing the instantaneous load current is also compared to a second reference level in the peak detector 36. The second reference level is effectively of greater magnitude than the first reference level. The second peak detector 36 initiates the transfer whenever the signal representing the load current instantaneously exceeds the second reference level.

Figure 3:
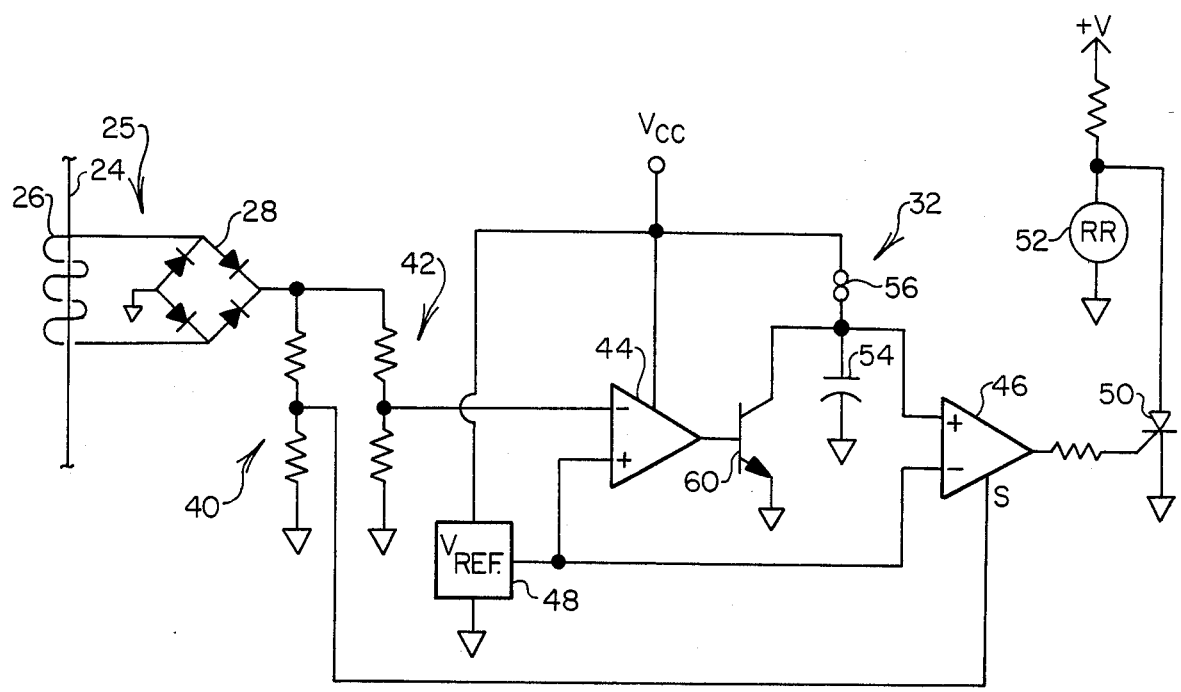
FIG. 3 is a simplified schematic diagram of the preferred embodiment of the invention.

FIG. 3 is a simplified schematic diagram illustrating in more detail the operation of the preferred embodiment of the invention.

In the preferred embodiment a commercially available, over voltage "crowbar" sensing circuit, MC3423, is used. It is used conventionally as a power supply supervisory circuit. It is a dual voltage level detector with a 0.5 microsecond response time. Its characteristics are discussed in more detail below. However, in FIG. 3 the circuit elements contained on the IC chip and the discrete circuit elements are not distinguished since the purpose of FIG. 3 is to explain the theory of operation of this circuit as a whole.

The signal representing the load current is derived from a signal conversion means 25. That signal is applied to a pair of voltage dividers 40 and 42 which scale the input signal to the desired levels. A pair of comparators 44 and 46 are connected to a reference level generating circuit 48. The scaled input signal from the voltage divider 42 is applied to the inverting input of the comparator 44 while the scaled input from the voltage divider 40 is applied to a remote activation input of the comparator 46.

As described in the literature for this integrated circuit, the remote input at pin 5 is compared to an internally provided reference level of two volts. Whenever the instantaneous amplitude of the signal from the voltage divider 40 exceeds two volts, comparator 46 switches states to fire the SCR 50. The relay 52 illustrated in FIG. 3 is equivalent to the switch 32 of FIG. 2. It has normally open contacts connecting the critical load to the primary source and normally closed contacts connecting the critical load to the secondary source. Under normal operation the normally open contacts are closed so that the critical load is supplied through the uninterruptable power system. However, firing of the SCR 50 provides a shunt or "crowbar" across the relay 52 causing it to drop out and thereby transferring the load to the secondary source. This relay and crowbar circuit is further described in the aforementioned U.S. Pat. No. 3,515,896.

The voltage divider 40 together with the remote input circuitry of the comparator 46 form the peak detector 36 of FIG. 2, the output of comparator 46 being switched by any scaled peak current signal which instantaneously exceeds 2 volts.

The output of the comparator 46 may also be switched in response to the signal derived from the voltage divider 42. For that purpose, a timer circuit 32 is formed by a capacitance 54 supplied by a constant current source 56 internally provided in the integrated circuit and capable of being discharged through a transistor 60.

In the preferred embodiment, the reference voltage 48 is 2.6 volts. So long as the scaled input signal to the inverting input of the comparator 44 is less than 2.6 volts, the bi-polar transistor 60 is turned on thereby shunting all current from the current source 56 and maintaining the capacitance 54 relatively discharged. Whenever the scaled signal applied to the inverting input from the comparator 44 exceeds 2.6 volts, the transistor 60 is switched off and the capacitance 54 begins charging.

If the signal at the inverting input of the comparator 44 falls below 2.6 volts, transistor 60 is turned on again and the capacitance 54 is discharged. If, however, it does not fall below the 2.6 volts, capacitance 54 continues to charge until its voltage exceeds 2.6 volts. Thereupon the comparator 46 switches output states turning on the SCR 50 to initiate a load transfer to the secondary source.

In the preferred embodiment, the circuit is designed so that the capacitance 54 will charge to 2.6 volts in 2 milliseconds. The discharge circuit through transistor 60 is designed so that discharge of the capacitance occurs in 0.2 milliseconds. Thus, the capacitance 54 is quickly discharged so that a new timing cycle may be initiated whenever the input signal from the voltage divider 42 exceeds the reference level. Therefore, the voltage divider 42 and comparator 44 operate as the first peak detector 30 described in FIG. 2, while the constant current source 56, capacitance 54, and transistor 60 provide the timer circuit 32 of FIG. 2. The comparator 46 operates as the time detector 34 of FIG. 2.

Figure 5:
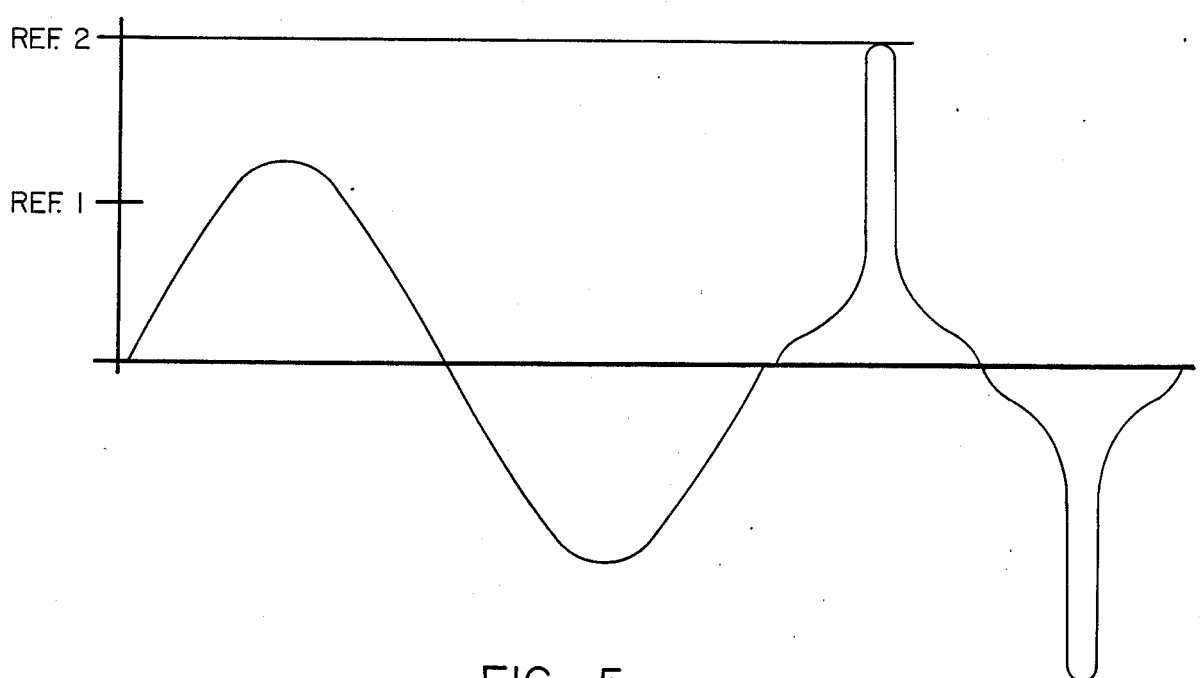
FIG. 5 is an oscillogram illustrating two different waveforms and the two effective reference levels.

FIG. 5 illustrates the first and second reference levels described above and two typical input waveforms, the first being a sinusoid and the second being distorted by a nonlinear load. As stated above, the load transfer occurs when the load current exceeds effective reference level 1 for a selected time interval or whenever the load current instantaneously exceeds effective reference level 2.

Voltage dividers 40 and 42 form a scaling means which scales the input signals to determine the effective positions of the first and second reference levels relative to the instantaneous load current. They scale the input signal so that the scaled input signal has the appropriate magnitude relative to the device reference level to which it is compared so that the circuitry will be actuated at the load current levels at which actuation is desired. Thus, the effective reference levels are controlled by selection of the scaling.

Figure 4:
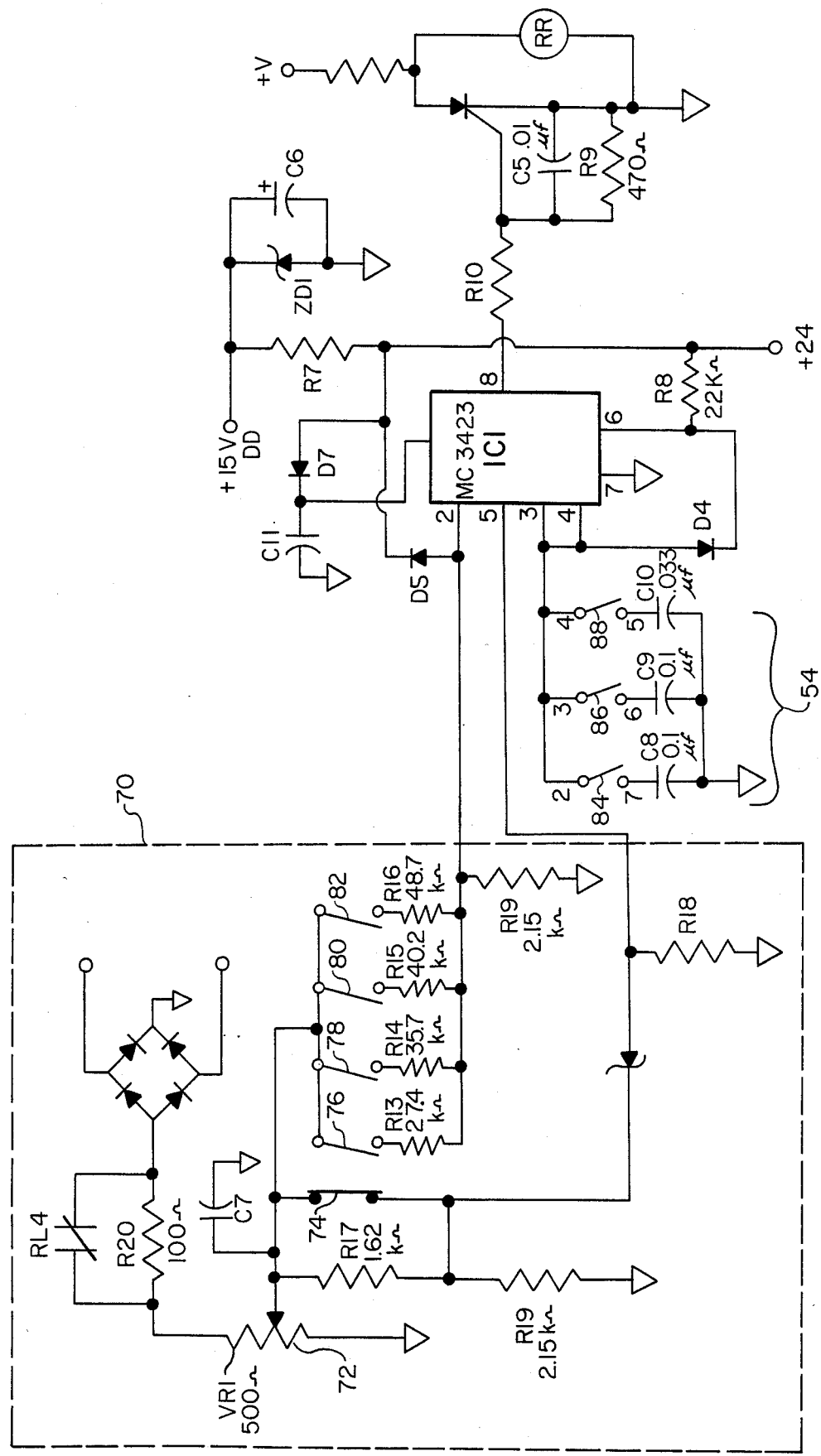
FIG. 4 is a detailed schematic diagram of the preferred enbodiment of the invention.

FIG. 4 illustrates in detail the preferred embodiment of the invention. The scaling circuitry is enclosed and labelled 70. It includes an adjusting potentiometer 72 and switches 74 through 82 which may be selectively switched in or out to permit the choice of a variety of different effective first and second reference levels which would be appropriate for different equipment and operating parameters.

Reference levels are preferably chosen so that the first reference level is effectively substantially equal to the instantaneous peak current of a sinusoid providing 120% of rated RMS current. The effective second reference level is preferably selected at substantially 3 times that rated RMS current.

The timer circuit capacitance preferably consists of three discrete capacitances C8 through C10 selectively operated by switched 84, 86 and 88. These accommodate both 50 and 60 Hz commercial utility power supplies. For 60 Hz, C8 and C9 are connected in the circuit by closing switches 84 and 86 while for 50 Hz, C10 is also used.

In order to speed the discharge of the timing capacitance C8-C10, the indicator output pin 6 of the integrated circuit IC1 is connected through a diode D4 to that capacitance. Whenever the input signal level is below the first reference level, current may flow through diode D4 to maintain the timing capacitance C8-C10 in a discharged state. However, the diode D4 blocks charging of that timing capacitance from pin 6 during a timing cycle.

It is possible that the input signal representing the load current could vary about either the first reference level or the second reference level over relatively short periods of time. Without circuitry to avoid the problem, it is possible that the static switch would consequently switch back and forth between the primary and secondary sources.

In order to avoid that problem, the normally closed contacts RL4 of a relay, which is essentially a slave to the static switch, are connected across the resistance R20. These contacts RL4 are closed when the static switch has switched the load to the secondary source and opened when the load is switched to the primary source. They provide a hysteresis effect by increasing the amplitude of the input signal when closed. Thus, when the static switch switches to the secondary source, the input signal level which is compared to the reference levels is increased. There must therefore be a significant decrease in the load current in order for the static switch to be returned to the primary source.

For example, if the circuitry is designed so that the first peak detector has a reference level causing it to be actuated at 120% of rated RMS current, closing the contacts RL4 may increase the input signal sufficiently that the SCR 1 will not be turned off until the load current falls below 100% of rated RMS current. This prevents a switching back and forth as the input current varies above and below 120% of rated RMS current.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

I claim:

1. A method for transferring a load from a first power source to a second power source whenever the r.m.s. load current exceeds the r.m.s. limits of the first power source, the method comprising:
   (a) continuously comparing a signal representing the instantaneous value of the load current from the first source to a first reference level;
   (b) timing the duration that said instantaneous signal uninterruptedly exceeds said first reference level;
   (c) initiating said transfer whenever said duration exceeds a selected time interval; and
   (d) continuously comparing a signal representing the instantaneous load current from the first source to a second reference level of greater magnitude than said first reference level and initiating said transfer whenever said signal exceeds said second reference level.

2. A method in accordance with claim 1 wherein said first reference level is substantially equal to $(1.2) \times (1.414) \times$ (rated maximum RMS current) and said second reference level is substantially $(3) \times$ (rated maximum RMS current).

3. A method in accordance with claim 2 wherein said selected time interval is substantially two milliseconds.

4. A method in accordance with claim 1 wherein the effective magnitude of said signal being compared to said second reference level is increased in response to initiation of a transfer for providing a dropout interval.

5. A current detecting circuit for actuating a switch to initiate the transfer of a load from a first power source to a second power source whenever the r.m.s. load current exceeds the r.m.s. limits of the first power source, the detecting circuit comprising:
   (a) a signal conversion means linked to said load for providing an output signal representing the instantaneous value of the electrical current from the first power source through said load;
   (b) a first peak detector circuit means, having its input connected to the output of the signal conversion means and including a first reference level generating circuit, for changing its output state in response to said instantaneous signal exceeding the first reference level;
   (c) a timing circuit means having an input connected to the output of said first peak detector circuit means for timing the duration that said instantaneous signal uninterruptedly exceeds said first reference level;
   (d) a timing detector circuit means having its input connected to the output of said timing circuit means and its output connected to the actuating input of said switch for actuating said switch in response to said duration exceeding a selected time interval; and
   (e) a second peak detector circuit means, having its input connected to the output of said signal conversion means, its output connected to the actuating input of said switch and including a second reference level generating circuit, for changing its ouptut state to actuate said switch in response to said instantaneous signal, which represents the load currents from the first source, exceeding the second reference level.

6. A circuit in accordance with claim 5 wherein said first and second peak detector circuit means each comprise a different comparator having a reference source connected to one input and said signal connected to the other.

7. A circuit in accordance with claim 6 wherein said timing circuit means comprises a constant current source connected to a gate and a capacitance to form a current loop for changing the capacitance through the gate, the gate having a control input connected to and which is controlled by the output of said first peak detector circuit means and wherein said timing circuit means comprises a third comparator having one input connected to a reference voltage source for selecting said time duration and the other input of the comparator connected to said capacitor for applying the capacitor voltage to the comparator input.

8. A circuit in accordance with claim 5 wherein a circuit providing a hysteresis effect is provided comprising a switch means for increasing the amplitude of the signal representing the load current whenever the critical load is connected to the secondary source.

* * * * *